(12) United States Patent
Suzuki et al.

(10) Patent No.: US 11,601,380 B2
(45) Date of Patent: Mar. 7, 2023

(54) COMMUNICATION NETWORK CONTROL SYSTEM, CENTRAL COMMUNICATION CONTROL DEVICE, COMMUNICATION CONTROL METHOD, AND COMMUNICATION CONTROL PROGRAM

(71) Applicant: NIPPON TELEGRAPH AND TELEPHONE CORPORATION, Tokyo (JP)

(72) Inventors: Tetsuya Suzuki, Musashino (JP); Takayuki Kusakabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/433,128

(22) PCT Filed: Feb. 7, 2020

(86) PCT No.: PCT/JP2020/004743
§ 371 (c)(1),
(2) Date: Aug. 23, 2021

(87) PCT Pub. No.: WO2020/175086
PCT Pub. Date: Sep. 3, 2020

(65) Prior Publication Data
US 2022/0150182 A1 May 12, 2022

(30) Foreign Application Priority Data
Feb. 26, 2019 (JP) .............................. JP2019-032839

(51) Int. Cl.
*H04L 47/80* (2022.01)
*H04L 47/127* (2022.01)
*H04L 67/12* (2022.01)

(52) U.S. Cl.
CPC .......... *H04L 47/805* (2013.01); *H04L 47/127* (2013.01); *H04L 67/12* (2013.01)

(58) Field of Classification Search
CPC ....... H04L 47/12; H04L 47/10; H04L 47/805; H04L 47/127; H04L 67/12; H04L 67/52; H04W 52/0216
See application file for complete search history.

(56) References Cited

U.S. PATENT DOCUMENTS 6,078,582 A * 6/2000 Curry .................... H04L 47/785
370/352
7,567,797 B1 * 7/2009 Lee ......................... H04L 41/12
455/445
(Continued)

FOREIGN PATENT DOCUMENTS

JP 200527018 A 1/2005
JP 2013157719 A 8/2013
(Continued)

*Primary Examiner* — Backhean Tiv
*Assistant Examiner* — Linh T. Nguyen

(57) ABSTRACT

An object of the present disclosure is to enable reduction of network congestion and concentration of communication on a server side that locally occur at the time of a disaster, an event, or the like and to enable important communication. A communication network control system according to the present disclosure includes: a plurality of communication control devices (20, 30) that control communication of apparatuses (92, 93); and a central communication control device (10) that distributes communication control information to the plurality of communication control devices, the central communication control device (10) collects event information linked to position information, determines an area with a probability that the amount of communication increases, using the collected event information, in a case in which there is an area with the probability that the amount of communication increases, generates communication con- (Continued)

trol information that places a priority on communication in the area, and distributes the generated communication control information to the plurality of communication control devices (20, 30).

10 Claims, 19 Drawing Sheets

(56) References Cited

U.S. PATENT DOCUMENTS

| | | | |
|---|---|---|---|
| 8,059,678 B1 * | 11/2011 | Medhat | H04L 47/12 370/466 |
| 9,516,522 B1 * | 12/2016 | Hewitt | H04W 4/12 |
| 10,348,888 B1 * | 7/2019 | Arnold | H04M 3/42042 |
| 10,362,168 B1 * | 7/2019 | Pitta Eswara Chandra | H04M 3/5183 |
| 2008/0016213 A1 | 1/2008 | Akinaga et al. | |
| 2010/0014652 A1 | 1/2010 | Yasuda | |
| 2013/0212422 A1 | 8/2013 | Bauer et al. | |
| 2016/0366183 A1 * | 12/2016 | Smith | H04L 63/06 |
| 2019/0037370 A1 * | 1/2019 | Beller | H04W 12/64 |
| 2019/0166480 A1 * | 5/2019 | Rauner | G08B 27/001 |
| 2020/0045674 A1 * | 2/2020 | Tseng | H04W 72/048 |

FOREIGN PATENT DOCUMENTS

| | | |
|---|---|---|
| JP | 2013243474 A | 12/2013 |
| JP | 2015510201 A | 4/2015 |
| WO | WO-2005060161 A1 | 6/2005 |
| WO | WO-2008126280 A1 | 10/2008 |

* cited by examiner

COMMUNICATION NETWORK CONTROL SYSTEM, CENTRAL COMMUNICATION CONTROL DEVICE, COMMUNICATION CONTROL METHOD, AND COMMUNICATION CONTROL PROGRAM

CROSS-REFERENCE TO RELATED APPLICATIONS

This application is a 371 U.S. National Phase of International Application No. PCT/JP2020/004743 filed on Feb. 7, 2020, which claims priority to Japanese Application No. 2019-032839 filed on Feb. 26, 2019. The entire disclosures of the above applications are incorporated herein by reference.

TECHNICAL FIELD

The present disclosure relates to a communication network control system, a central communication control device, a communication control method, and a communication control program.

BACKGROUND ART

Various Internet of Things (IoT) systems have been proposed for performing control of communication of IoT devices (see Patent Literature 1 to 3, for example). For example, a first related IoT system dynamically determines the importance of communication and changes and controls the priority and the like of the communication on an IoT apparatus side. A second related IoT system performs communication by randomly shifting a communication time on an IoT apparatus side, or performs communication in a preset communication time period, or performs communication by performing polling (crawling) in a round-robin manner from a server side to the IoT apparatus side. A third related IoT system secures resources on a data center side in advance and temporarily adds a virtual server in accordance with a status of a load (communication). According to a fourth related IoT system, an upper limit of the number of communications that can be performed at the same time is provided.

In this manner, the related IoT systems use forms of event-driven communication (autonomous distributed) or a round robin-like polling communication from the server and do not use a mechanism that performs control of communication of entire IoT systems.

There is a trend of IoT apparatuses frequently performing various kinds of communication during certain events such as disasters (typhoons, earthquakes, heavy rain and floods, and the like) and disturbances that accompany scheduled events taking place. On the other hand, there may be cases in which at the time of occurrence of such an event, local network congestion and concentration of communication on the server side occur and these become a reason that genuinely important communication such as safety confirmation information after occurrence of a disaster or a notification of occurrence of a serious situation cannot be performed normally. In such cases, the first to fourth related IoT systems have the following problems. Specific description will be given with reference to FIG. 1.

According to the first related IoT system, even if network congestion or concentration of communication occurs on a server 92 side, an IoT apparatus 93 side cannot determine or detect the occurrence from the device side, and cannot recognize the occurrence until the IoT apparatus 93 attempts and fails to communicate with the server 92. Also, because communication control for switching to a priority communication service or the like is performed thereafter, there is a concern that a probability that communication will not be able to be performed normally will increase and that network congestion may be exacerbated due to the communication. In addition, because the server 92 side performs communication with a priority determined on the side of the IoT apparatus 93 in the first related IoT system, there is a problem where genuinely it may be impossible to select important communication to be performed on the server 92 side when network congestion and concentration of communication occur on the side of the server 92. In cases in which a wide range of disasters or the like occur, for example, many IoT apparatus 93 at different locations starts to perform communication at a time at which concentration of communication on the server side 92 occurs, and genuinely important communication (such as a notification of serious injury) may not be able to be performed.

In the second related IoT system, the following problem occurs. In a case in which communication is randomly shifted, it is not possible for the IoT apparatus 93 side to reliably avoid network congestion and concentration of communication on the server 92 side, and it is not possible for the server 92 side to sort genuinely important communication and perform the communication. In a case in which communication is performed in a preset communication time period, it is not possible for the IoT apparatus 93 side to perform communication with the server 92 at a timing when the communication is genuinely needed, and it is not possible for the server 92 side to perform communication with the IoT apparatus 93 with which the server 92 genuinely needs to communicate.

According to the third related IoT system, the following problem occurs. It is not possible to ascertain how many resources are to be secured to secure resources for a data center in advance. Also, addition of a virtual server is not preferable in terms of costs. In addition, in a case in which resources of the server 92 are shared with others, it is not always possible to reliably implement the addition. Moreover, because it is not possible to add a physical line bandwidth, IoT apparatuses 93 that cannot perform communication may occur when more concentration of communication occurs. Also, in a case in which a physical line is shared with other service users, it is not possible to reliably perform communication when other communication also becomes concentrated.

According to the fourth related IoT system, it is not possible to sort and communicate with an IoT apparatus 93 with which communication is genuinely needed.

CITATION LIST

Patent Literature

Patent Literature 1: WO 2008/126280
Patent Literature 2: JP 2013-157719 A
Patent Literature 3: JP 2015-510201 B

SUMMARY OF THE INVENTION

Technical Problem

An object of the present disclosure is to solve the problems that cannot be solved by the first to fourth related IoT systems, that is, to reduce network congestion and concentration of communication on a server side that locally occur at the time of a disaster or an event and to enable genuinely important communication.

Means for Solving the Problem

Information with which the occurrence of network congestion and concentration of communication on a server side (place of occurrence and the date and time thereof) can be predicted to some extent from information on the occurrence of natural disasters, scheduled events due to take place, and the like is distributed as electronic information from various places. It is possible to foresee network congestion and concentration of communication on the server side to some extent using such information.

Thus, the present disclosure provides a system including: communication control devices that control communication of each of apparatuses such as a server and IoT apparatuses; and a central communication control device that controls each of the communication control devices, in which the central communication control device detects or predicts network congestion or concentration of communication on a server side on the basis of event information linked to position information of disaster forecasting, events, and the like, generates communication control information such as a communication schedule for each area such that communication between the server device and each IoT apparatus is geographically and temporally dispersed, on the basis of the detection or the prediction, and distributes the communication control information to each communication control device.

Specifically, a communication network control system according to the present disclosure includes: a plurality of communication control devices provided in a plurality of apparatuses that are arranged in a geographically dispersed manner and that are included in a communication network to which the plurality of apparatuses are connected, the communication control devices being configured to control communication of each of the plurality of apparatuses in accordance with distributed communication control information; and a central communication control device configured to distribute communication control information to the plurality of communication control devices. The central communication control device collects event information linked to position information, determines an area with a probability that the amount of communication increases, using the collected event information, and in a case in which there is an area with the probability that the amount of communication increases, generates communication control information that places a priority on communication in the area, and distributes the generated communication control information to the plurality of communication control devices.

A configuration may be employed in which the central communication control device determines an area and a time with a probability that the amount of communication increases, using the collected event information, and in a case in which there is an area with the probability that the amount of communication increases, generates the communication control information that places a priority on the communication in the area in the time with the probability that the amount of communication increases.

A configuration may be employed in which the plurality of apparatuses include a server, and a communication control device of the plurality of communication control devices that is included in the server places a priority on communication with the area with the probability that the amount of communication increases in the time with the probability that the amount of communication increases, in accordance with the distributed communication control information.

A configuration may be employed in which the plurality of apparatuses include IoT apparatuses, the communication control device included in the server creates an access control list of the IoT apparatuses that perform communication with the server using the communication control information received from the central communication control device and distributes the access control list to each of the IoT apparatuses, and the communication control devices included in the IoT apparatuses access the server in accordance with the access control list received from the communication control device included in the server.

Here, for the communication control information, area codes may be used as information for specifying areas, and the area codes may be allocated to subnet IDs in the access control list.

Specifically, a central communication control device according to the present disclosure is a central communication control device in a communication network control system that includes a plurality of communication control device provided in a plurality of apparatuses that are arranged in a geographically dispersed manner and that are included in a communication network to which the plurality of apparatuses are connected, the communication control devices controlling communication of each of the plurality of apparatuses in accordance with distributed communication control information, and the central communication control device that distributes communication control information to the plurality of communication control devices. The central communication control device collects event information linked to position information, determines an area with a probability that the amount of communication increases, using the collected event information, and in a case in which there is an area with the probability that the amount of communication increases, generates communication control information that places a priority on communication in the area, and distributes the generated communication control information to the plurality of communication control devices.

Specifically, a communication control method according to the present disclosure is a communication control method executed by a central communication control device in a communication network control system that includes a plurality of communication control devices provided in a plurality of apparatuses that are arranged in a geographically dispersed manner and that are included in a communication network to which the plurality of apparatuses are connected, the communication control devices controlling communication of each of the plurality of apparatuses in accordance with distributed communication control information, and the central communication control device that distributes communication control information to the plurality of communication control devices, the method including, by the central communication control device: collecting event information linked to position information; determining an area with a probability that the amount of communication increases, using the collected event information; in a case in which there is an area with the probability that the amount of communication increases, generating communication control information that places a priority on communication in the area; and distributing the generated communication control information to the plurality of communication control devices.

Specifically, a communication control program according to the present disclosure is a program that is included in the center communication control device according to the present disclosure and causes a computer to implement each function included in the central communication control device according to the present disclosure. The communication control program according to the present disclosure may be recorded in a recording medium or may be provided through a network.

Note that each of the aforementioned disclosures can be combined as long as the combinations are possible.

Effects of the Invention

According to the present disclosure, it is possible to reduce network congestion and concentration of communication on a server side that locally occur at the time of disasters, events, and the like and to enable genuinely important communication.

DESCRIPTION OF EMBODIMENTS

Hereinafter, embodiments of the present disclosure will be described in detail with reference to the drawings. Note that the present disclosure is not limited to the embodiments described below. These embodiments are just illustrative example, and the present disclosure can be implemented in forms in which various modifications and improvements are added on the basis of knowledge of those skilled in the art. Note that components with the same reference signs in the specification and the drawings are assumed to be the same components.

Figure 1:
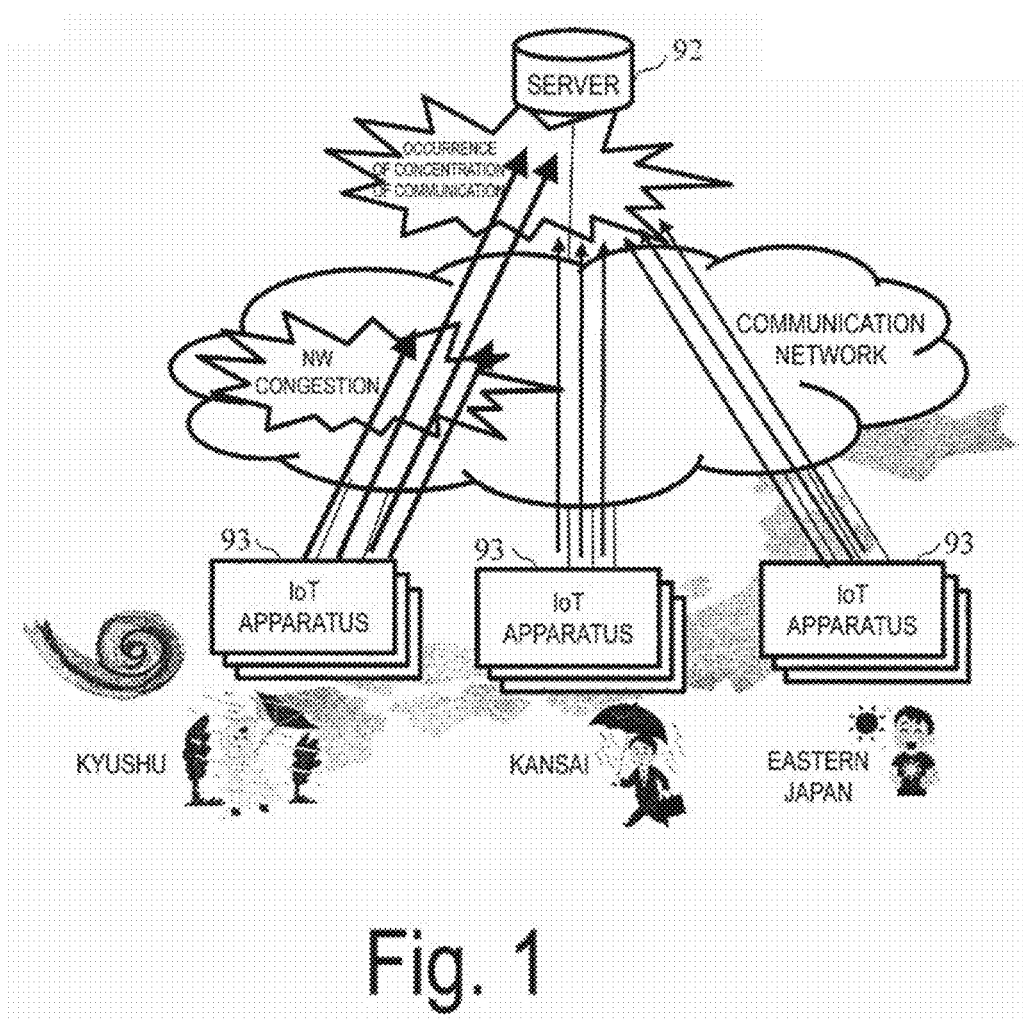
FIG. 1 illustrates an example of a configuration of an IoT system related to the present disclosure.
Figure 2:
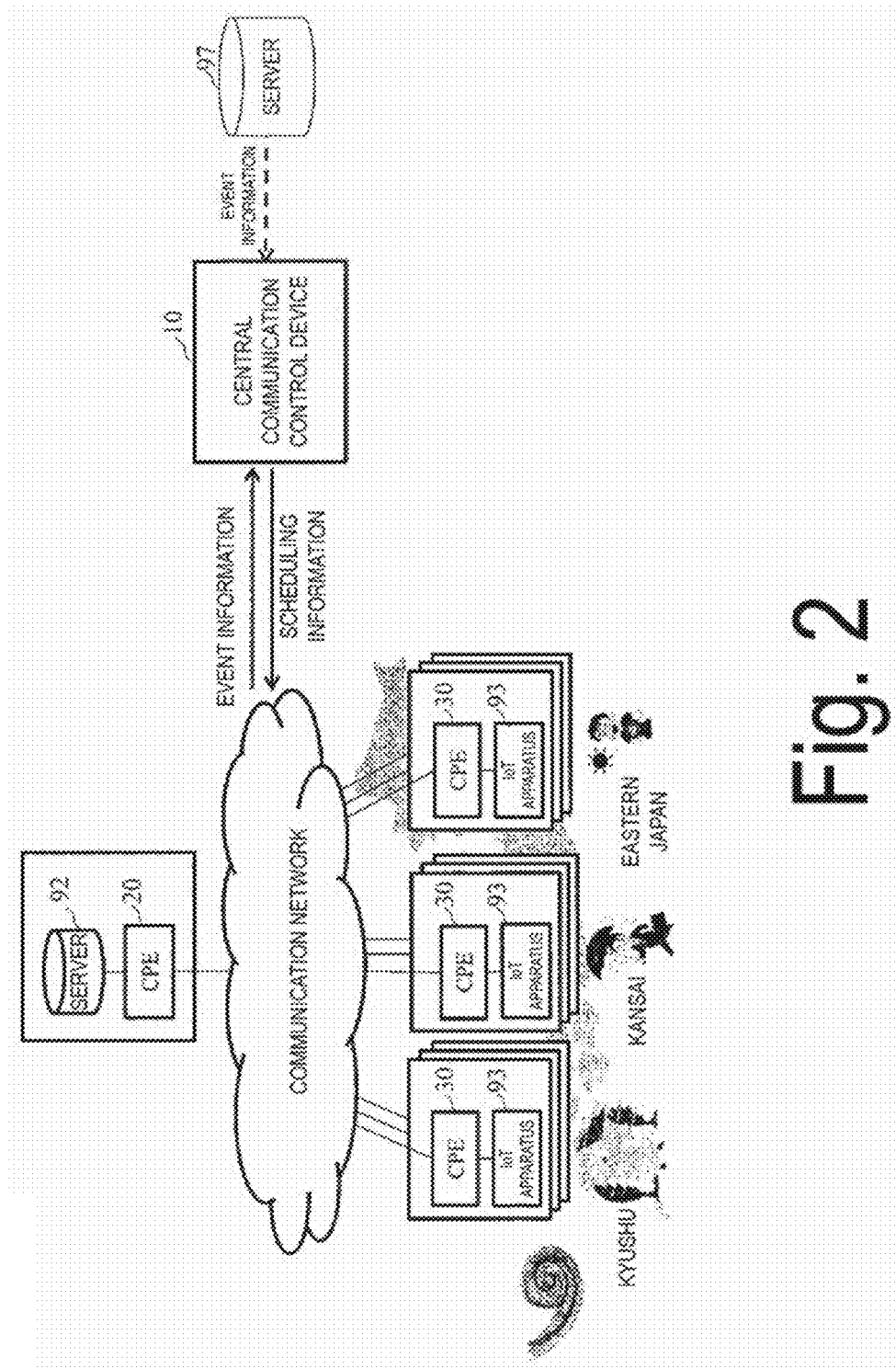
FIG. 2 illustrates an overview of a system configuration according to the present disclosure.

Overview of Communication Network Control System according to Present Disclosure FIG. 2 illustrates an example of a system configuration according to the present disclosure. The communication network control system according to the present disclosure includes a central communication control device 10, a communication control device 20 disposed on the side of a server 92, and a communication control device 30 arranged on the side of an IoT apparatus 93. In the communication network according to the present disclosure, the server 92 is connected to a plurality of IoT apparatuses 93 arranged in geographically dispersed manner. The communication control device 20 performs communication control for the server 92, and the communication control device 30 performs communication control for the IoT apparatuses 93. The communication control devices will be referred to as customer premises equipment (CPE) in the present disclosure.

In regard to natural disasters, types, times, and locations of occurrence thereof can be foreseen to some extent, and information thereof is distributed as electronic information of disaster prevention weather information from the Meteorological Agency (Japan Meteorological Business Support Center). Also, event restriction information that accompanies scheduled events is distributed as electronic information from the Japan Road Traffic Information Center, and evacuation information and citizen protection information are distributed as electronic information from the Foundation for MultiMedia Communications (L alert). The central communication control device 10 collects information linked to such position information as "event information" from a server 97.

The central communication control device 10 foresees an area and a time period in which the amount of communication temporarily increases and congestion and a large amount of communication occur with occurrence of an event such as a disaster, on the basis of the collected information, plans communication scheduling, and distributes the communication scheduling to the communication control devices 20 and 30 in advance, thereby geographically and temporally dispersing the communication. As a result, network congestion is avoided, and concentration of communication on the server side is prevented so that genuinely important information can be communicated reliably.

Operations of Central Communication Control Device 10

The central communication control device 10 receives event information distributed from the server 97 of the Meteorological Agency/the Japan Road Traffic Information Center/L alert or the like and foresees a place and a time period in which network congestion and concentration of communication on the server side occur with occurrence of an event. Further, the central communication control device 10 plans communication scheduling in accordance with apparatus installation locations of contractors from contractor information. Further, the central communication control device 10 distributes communication control information to each apparatus in advance.

The central communication control device 10 appropriately changes the communication schedule and redistributes the communication schedule to each apparatus on the basis of successively distributed information during occurrence of the event.

Example of Communication Control Information Distributed to Each Device by Central Communication Control Device 10

IoT apparatus 93 side: a time period in which genuinely important communication is to be performed and a priority, a time period in which non-essential and non-urgent communication is to be suppressed, and the like Server 92 side: a list of IoT apparatuses 93 with a probability that genuinely important communication will be performed and a time period and a priority thereof Operations on Side of IoT Device 93

The communication control device 30 performs communication control for the IoT apparatuses 93 in accordance with communication control information such as communication scheduling distributed from the central communication control device 10. For example, it is possible to exemplify suppression of non-essential and non-urgent communication through utilization of priority communication services, restriction of communication bandwidths, addition of various priority identifiers, communication flow control, communication path securing setting, accumulation of communication in the device itself or a nearby replacement server, and retransmission with delays.

Operations on Side of Server 92

The communication control device 20 performs communication control in accordance with communication control information such as communication scheduling distributed from the central communication control device 10. It is possible to exemplify selection of communication (suppression of communication) or the like on the basis of communication path settings secured in advance, allocation of communication bandwidths to communication, communication flow control, suppression of communication related to devices other than those in the communication target list, and distributed priority information for each communication target, for example. In a case in which concentration of communication occurs, more active communication control is performed. It is possible to exemplify sorting of communication (exclusion of communication) or the like on the basis of exclusion of communication related to devices other than those in the communication target list and distributed priority information for each communication target, for example. Here, the "communication targets" are any devices that perform communication with the server 92, and it is possible to exemplify the IoT apparatuses 93, for example.

Effects of the Present Disclosure

According to the present disclosure, the central communication control device 10 plans a communication schedule using information distributed in advance and distributes communication control information such as scheduling information to each device in advance. According to the present disclosure, it is thus possible to geographically and temporally disperse communication, to avoid/reduce network congestion that locally occurs, to suppress concentration of communication on the server side, and thereby to reliably enable genuinely important communication.

Here, the communication control information distributed to the side of the IoT devices 93 in advance is a time period in which genuinely important communication is to be performed, a priority thereof, and a time period in which non-essential and non-urgent communication is to be suppressed, for example. The information distributed to the side of the server 92 in advance is, for example, a list of IoT apparatuses 93 with a probability that genuinely important communication will be performed, a time period thereof, a priority thereof, and the like. Although an example in which the "communication control information" is "scheduling information" will be described in embodiments described below, the present disclosure is not limited thereto.

Moreover, according to the present disclosure, the central communication control device 10 successively distributes information regarding a change in scheduling information and priority of communication on the basis of successively distributed communication control information during occurrence of an event such as a disaster. According to the present disclosure, it is thus possible to optimize geographical and temporal dispersion of communication, to sort important communication on the side of the server 92 using the information regarding a priority of communication when concentration of communication occurs on the side of the server 92, and to reliably enable genuinely important communication.

First Embodiment

Figure 3:
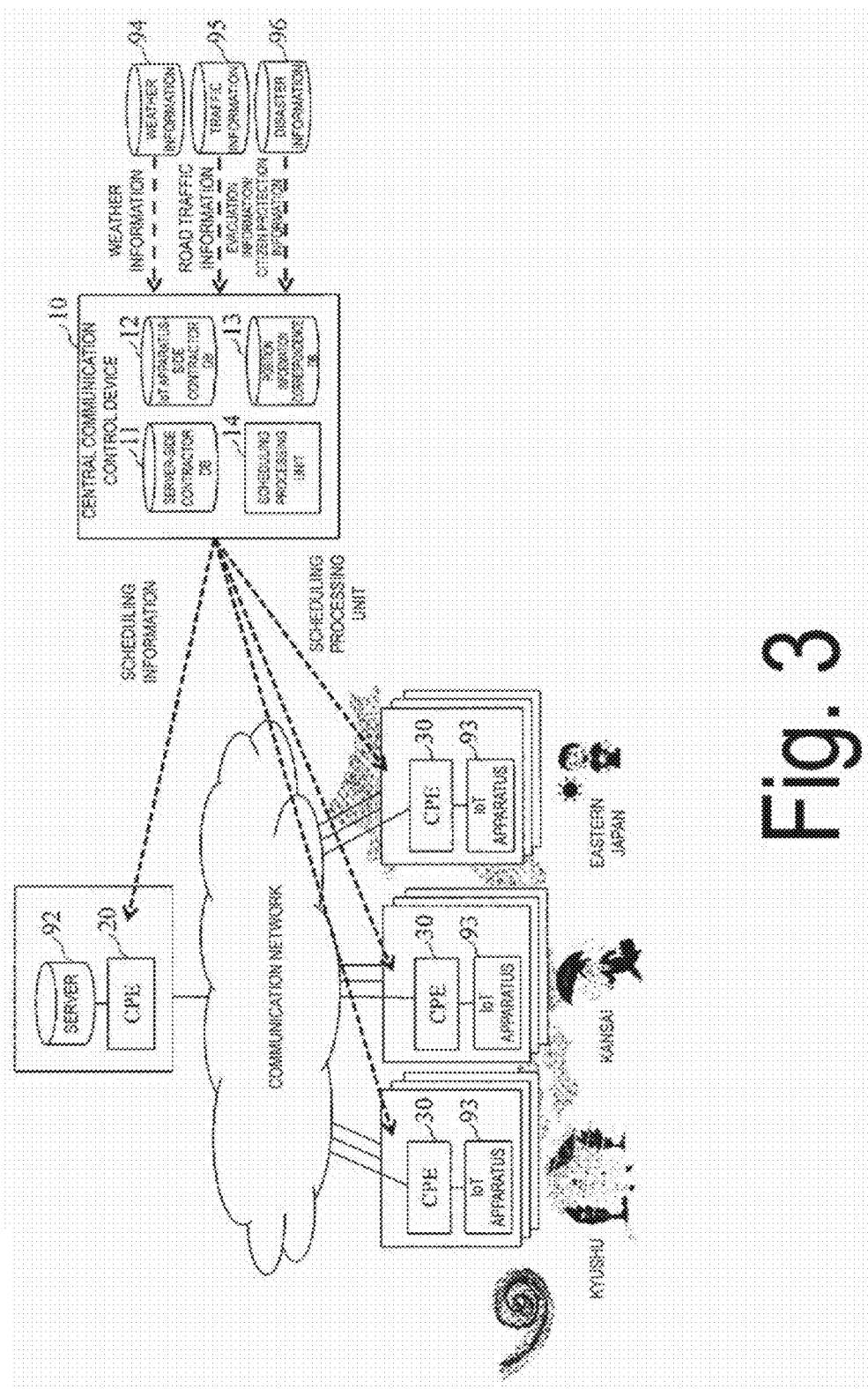
FIG. 3 illustrates an example of a system configuration according to the present embodiment.

FIG. 3 illustrates an example of a system configuration according to the present embodiment. In the system according to the present disclosure, the central communication control device 10 includes a server-side contractor database 11, an IoT apparatus-side contractor database 12, a position information correspondence database 13, and a scheduling processing unit 14.

In the present embodiment, the central communication control device 10 acquires weather information from a weather information server 94, acquires road traffic information from a traffic information server 95, and acquires evacuation information and citizen protection information from a disaster information server 96. The weather information server 94 from which the central communication control device 10 acquires the weather information is a server managed by the Meteorological Agency, for example. The traffic information server 95 from which the central communication control device 10 acquires the road traffic information is a server managed by the Japan Road Traffic Information Center (JARTIC), for example. The disaster information server 96 from which the central communication control device 10 acquires the evacuation information and the citizen protection information is a server of an L alert of a disaster information sharing system, for example. The central communication control device 10 may be connected directly to the weather information server 94, the traffic information server 95, and the disaster information server 96 or may be connected thereto via a communication network.

The server-side contractor database 11 stores an installation location, an area code, and an Internet Protocol (IP) address of the server 92. The IoT apparatus-side contractor database 12 stores installation locations, area codes, and IP addresses of the IoT apparatuses 93. The position information correspondence database 13 links event information collected by the central communication control device 10 to the position information and stores the event information with the position information linked thereto.

The scheduling processing unit 14 creates a communication schedule and distributes communication scheduling information to the communication control devices 20 and 30 on the basis of the event information stored in the position information correspondence database 13.

The position information correspondence database 13 stores the event information acquired from the weather information server 94, the traffic information server 95, and the disaster information server 96 in association with the position information. For example, the central communication control device 10 converts the position information related to the event information distributed from each location into an area code (0ABCD number <MA>) with reference to the database as illustrated in FIG. 4 and stores the area code in the position information correspondence database 13.

Figure 4:
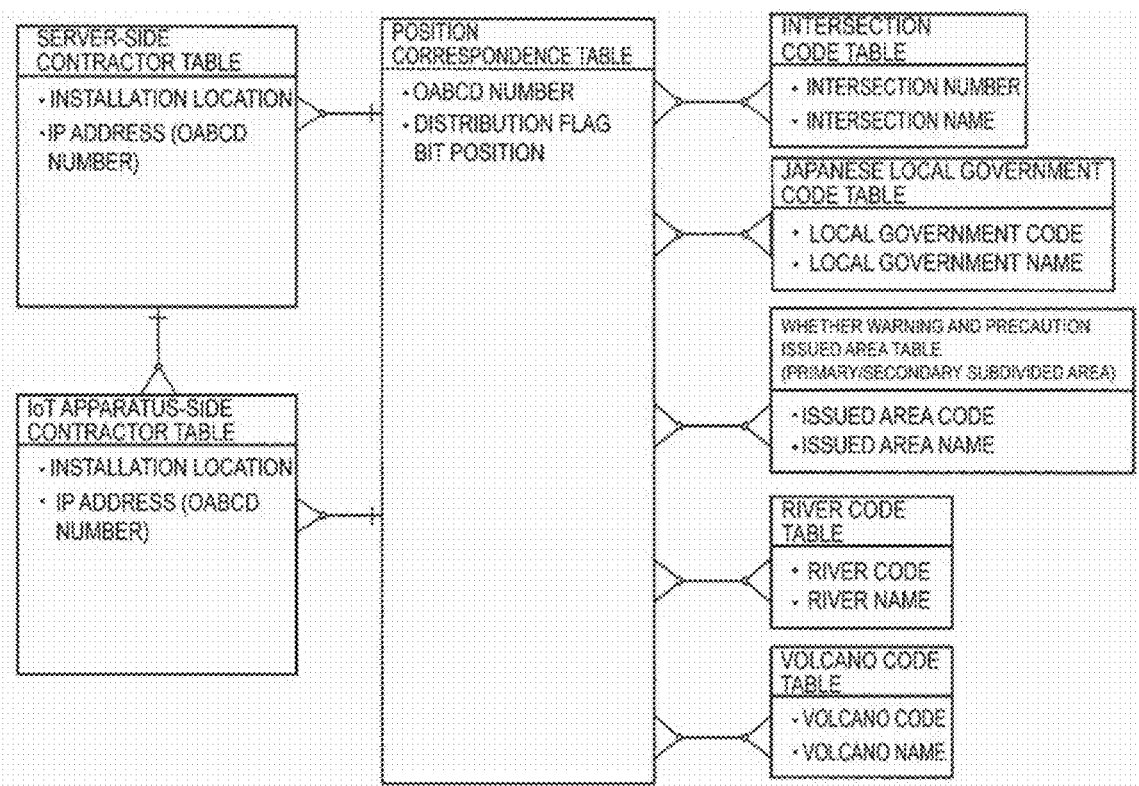
FIG. 4 is a database model example for association of position information.

As illustrated in FIG. 4, the server-side contractor table and the IoT apparatus-side contractor table are associated in a position correspondence table. The server-side contractor table is a table, which is stored in the server-side contractor database 11, in which the installation location, the IP address, and the area code of the server 92 are linked to each other. The IoT apparatus-side contractor table is a table, which is stored in the IoT apparatus-side contractor database 12, in which installation locations, the IP addresses, and the area codes of the IoT apparatuses 93 are linked to each other. The position correspondence table is a table for correspondence of distribution flag bit positions and area codes. The "distribution flag bit positions" will be described later.

As illustrated in FIG. 4, an intersection code table, a Japanese local government code table, a weather warning and precaution issued area table (primary/secondary subdivided area), a river code table, and a volcano table are associated with the position correspondence table. The intersection code table is for correspondence of intersection numbers and intersection names. The Japanese local government code table associates local government codes with local government names. The weather warning and precaution issued area table (primary/secondary subdivided area) is for correspondence of issued area codes and issued area names. The river code table is for correspondence of river codes and river names. The volcano code table is for correspondence of volcano codes and volcano names.

In a case in which weather information includes an issued area name and a river name, it is possible to convert the river name included in the weather information into an area code with reference to the weather warning and precaution issued area table (primary/secondary subdivided area) and the river code table. In a case in which weather information includes an issued area name and a volcano name, it is possible to convert the volcano name into an area code with reference to the weather warning and precaution issued area table (primary/secondary subdivided area) and the volcano code table.

In a case in which road traffic information includes a local government name and an intersection name, it is possible to convert the intersection name into an area code with reference to the Japanese local government code table and the intersection code table.

Because information of the L alert includes a local government name, it is possible to convert the local public institution name into an area code with reference to the Japanese local government code table.

Figure 5:
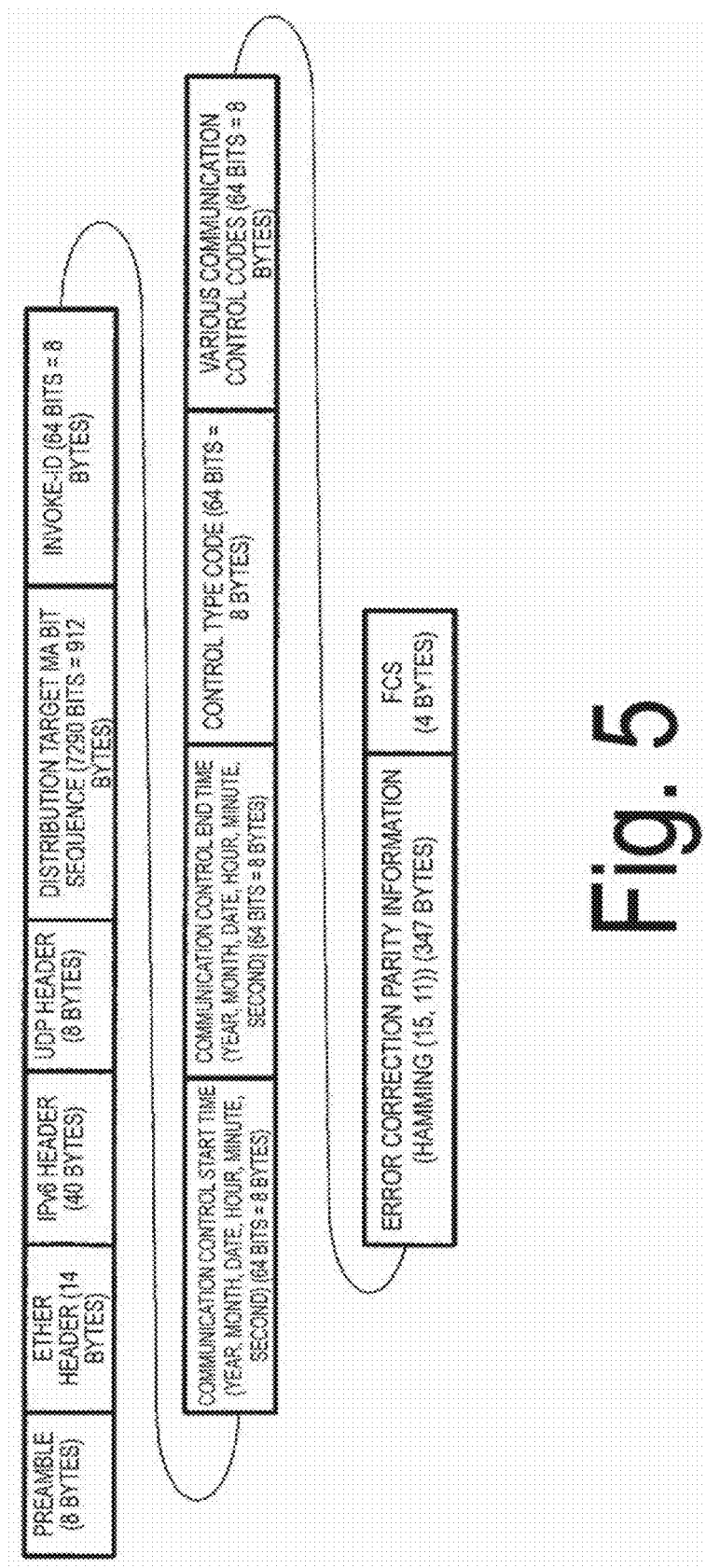
FIG. 5 illustrates an example of a frame configuration that distributes scheduling information.

FIG. 5 illustrates an example of a frame configuration for distributing scheduling information. A frame for distributing scheduling information includes a distribution target MA bit sequence, communication control start time (year, month, date, hour, minute, and second), communication control end time (year, month, date, hour, minute, and second), a control type code, and various communication control codes. The control type code is a code indicating a control target. As a control target, it is possible to exemplify a priority, window sizes, communication bandwidths, and communication paths, for example. The various communication control codes are codes indicating specific details of control performed on the control target. In a case in which the "control target" has priority, it is possible to exemplify, as details of control, setting of a specific priority "7" from among priorities of 0 to 7 and changing of the priorities of equal to or less than 6 of communication to 0, for example.

The "distribution target MA bit sequence" is a bit sequence indicating an area that is a target of communication control and is represented by four-digit information of an area code "ABCD". The distribution target MA bit sequence may be position information linked to event information distributed from each location. The four-digit information bit number of the area code "ABCD" is 9×9×9×10=7290 bits. In this manner, the central communication processing device 10 converts position information of information distributed from each location into an area code (0ABCD number <MA>), further converts the area code into a "distributed target MA bit sequence", and broadcasts the distribution target MA bit sequence to the communication control devices 20 and 30.

The "distribution flag bit position" stored in the "position correspondence table" is information indicating which bit in the "distribution target MA bit sequence" is to be employed. In a case in which ten types of numbers are available for each of the digits ABCD in the "distribution target MA bit sequence", that is, in a case in which 10×10×10×10=10,000 bits are used for the "distribution target MA bit sequence", and if an area code is "092", for example, it is possible to set the "distribution flag bit position" to 9200 to 9299 bits and to represent "ABCD" as "92XX". "XX" is any number from "00" to "99" used for the "distribution flag bit position". In this manner, a plurality of area codes can be stored in the "distribution target MA bit sequence" in FIG. 5, and it is also possible to designate a range of area codes such as a range of 092 to 097.

In a case in which the "distribution target MA bit sequence" is 9×9×9×10=7290 bits as illustrated in FIG. 5, the number "092" of the area code cannot be represented as "92XX". Thus, a position correspondence table is referred to such that a bit position corresponding to an area code can easily be derived, in the present disclosure. For example, 6571 to 6660 bits are associated as the "distribution flag bit position" corresponding to the area code "092". It is thus possible to easily derive the area code from the "distribution target MA bit sequence" with reference to the position correspondence table.

Although the frame for distributing the scheduling information appears to be a long bit sequence, the frame is 912 bytes in terms of bytes. The entire information from the head to FCS excluding a preamble is 1365 bytes and falls within a range of equal to or less than 1518 bytes that correspond to the maximum frame length of an Ethernet (trade name) frame. Thus, with Ethernet and IPv6 UDP headers and other important information implemented, it is possible to sufficiently implement the headers and the information and thereby to sufficiently broadcast the scheduling information to all the devices using one packet. It is thus possible to perform quick distribution even in a case of highly urgent schedule distribution based on information such as emergency earthquake report and citizen protection information.

The server 92 side performs communication with each IoT apparatus 93 on the basis of the scheduling information distributed from the central communication processing device 10, and it is possible to efficiently perform processing if address allocation on the side of the IoT apparatuses 93 is performed using ULA of IPv6 (unique local IPv6 unicast address) or a site local address.

Figure 6:
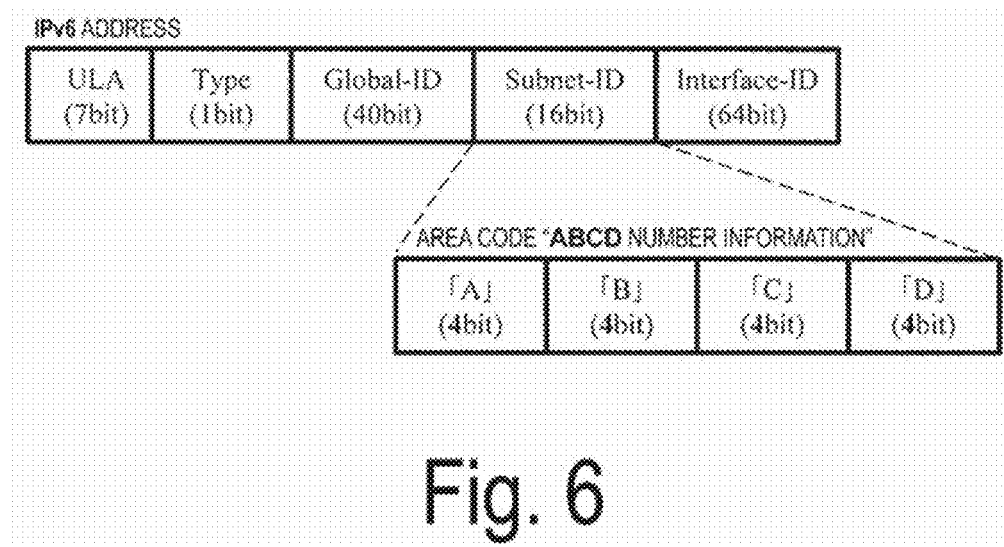
FIG. 6 illustrates an example of address allocation of each device.

FIG. 6 illustrates an example of address allocation to each IoT apparatus 93. This is an example of address allocation implementation using ULA, and each number area of an area code (0ABCD number <MA>) is allocated to each nibble (4 bits) of a subnet ID (2 bytes) of ULA. In this manner, because it is only necessary to allocate area code information to the subnet ID and to generate an access control list (ACL) when the ACL is set from the distribution target MA bit sequence of the scheduling information received from the side of the server 92, efficient processing can be performed. Also, it is possible to easily determine whether the received scheduling information is targeted at each IoT apparatus 93 itself on the side of the IoT apparatus 93 using the subnet ID of the IPv6 address set for the apparatus itself.

Figure 7:
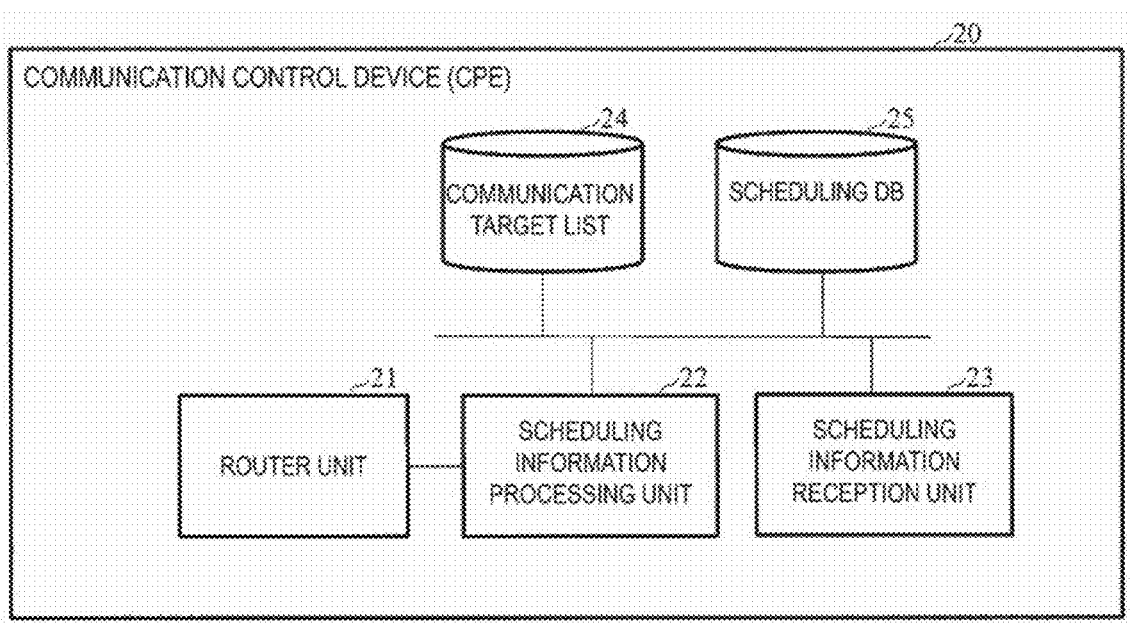
FIG. 7 illustrates an example of a configuration of a communication control device on a server side.

FIG. 7 illustrates an example of a configuration of the communication control device 20 on the side of the server 92. The communication control device 20 includes a router unit 21, a scheduling information processing unit 22, a scheduling information reception unit 23, a communication target list 24, and a scheduling DB 25.

The communication target list 24 stores a list of communication targets that perform communication with the server 92. The list of communication targets includes installation locations, area codes, and IP addresses of the IoT apparatuses 93 that are communication targets. The scheduling DB 25 is a database that stores a communication schedule with the communication targets.

Figure 8:
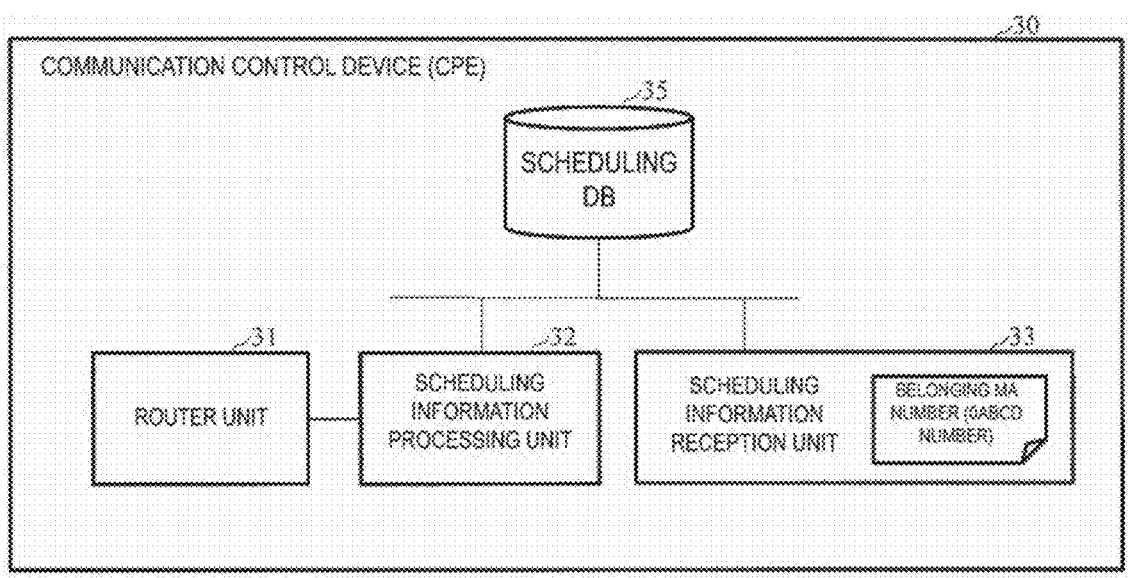
FIG. 8 illustrates an example of a configuration of a communication control device on an IoT apparatus side.

FIG. 8 illustrates an example of a configuration of the communication control device 30 on the side of each IoT apparatus 93. The communication control device 30 includes a router unit 31, a scheduling information processing unit 32, a scheduling information reception unit 33, and a scheduling DB 35. The scheduling DB 35 is a database that stores a communication schedule with the IoT devices 93 that are control targets.

Figure 9:
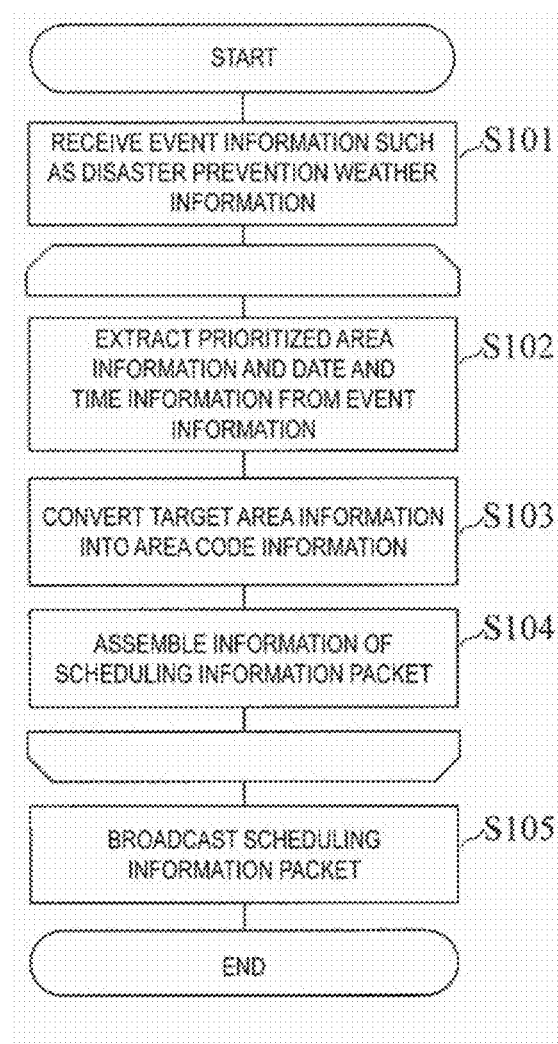
FIG. 9 illustrates an example of a processing flow of a central communication control device.

FIG. 9 illustrates an example of a processing flow of the central communication control device 10. The central communication control device 10 performs Step S101, then performs Steps S102 to S104, and then performs Step S105. In Step S101, the central communication control device 10 receives event information such as disaster prevention weather information.

In Step S102, the central communication control device 10 extracts priority target area information and date and time information from the event information. In Step S103, the central communication control device 10 converts target area information into area code information. In Step S104, the central communication control device 10 assembles information of a scheduling information packet.

In Step S105, the central communication control device 10 broadcasts the scheduling information packet regardless of the target area.

Figure 10:
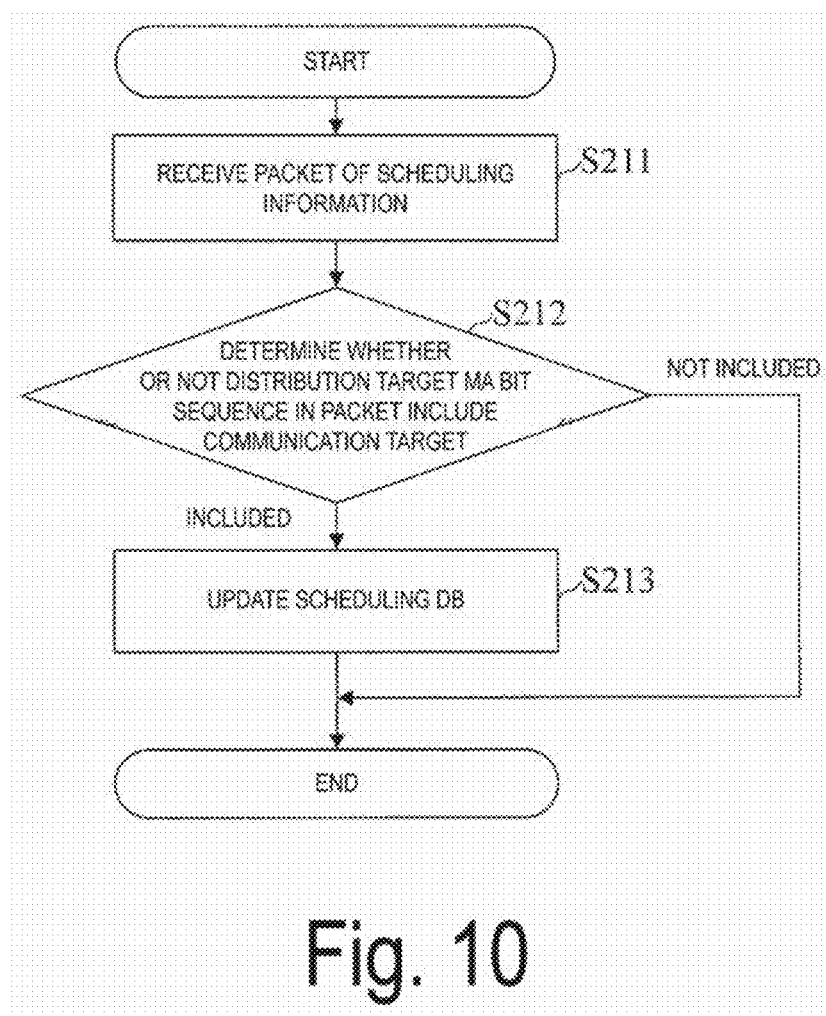
FIG. 10 illustrates an example of a processing flow of a scheduling information reception unit on the server side.

FIG. 10 illustrates an example of a processing flow of the communication control device 20 when the scheduling information reception unit 23 on the side of the server 92 receives scheduling information.

First, the communication control device 20 receives a packet of scheduling information (S211). Next, the communication control device 20 determines whether communication targets are included in the distribution target MA bit sequence in the packet (S212). For example, the scheduling information processing unit 22 determines whether or not there is an area code that conforms to the distribution target MA bit sequence in the communication scheduling information from among the area codes indicating the installation locations of the IoT apparatuses 93 in the communication target list 24.

In a case in which no communication targets are included in the distribution target MA bit sequence, the communication control device 20 ends the processing.

Meanwhile, in a case in which communication targets are included in the distribution target MA bit sequence, the scheduling information processing unit 22 reads the communication schedule from the scheduling DB 25, sets the communication schedule with the communication targets in accordance with the communication scheduling information, and updates the scheduling DB 25 (S213).

Here, as the setting of the communication schedule on the side of the server 92, it is possible to exemplify utilization of priority communication services, setting of communication paths, addition of priority identifiers, restriction of communication bandwidths, control of communication flows (transmission control protocol (TCP) window control and the like), and suppression and exclusion of communication regarding devices other than those in the communication target list, for example. As the addition of priority identifiers, it is possible to exemplify a type of service (ToS) that is set in a header of an IPv4 packet and designates a priority order of transmission and reception, a class of service (CoS) that is set in a VLAN tag of an Ethernet frame and designates a priority order of transmission and reception, a traffic class (TC) that designates a priority order with 8-bit information in a header of an IPv6 packet, for example.

Figure 11:
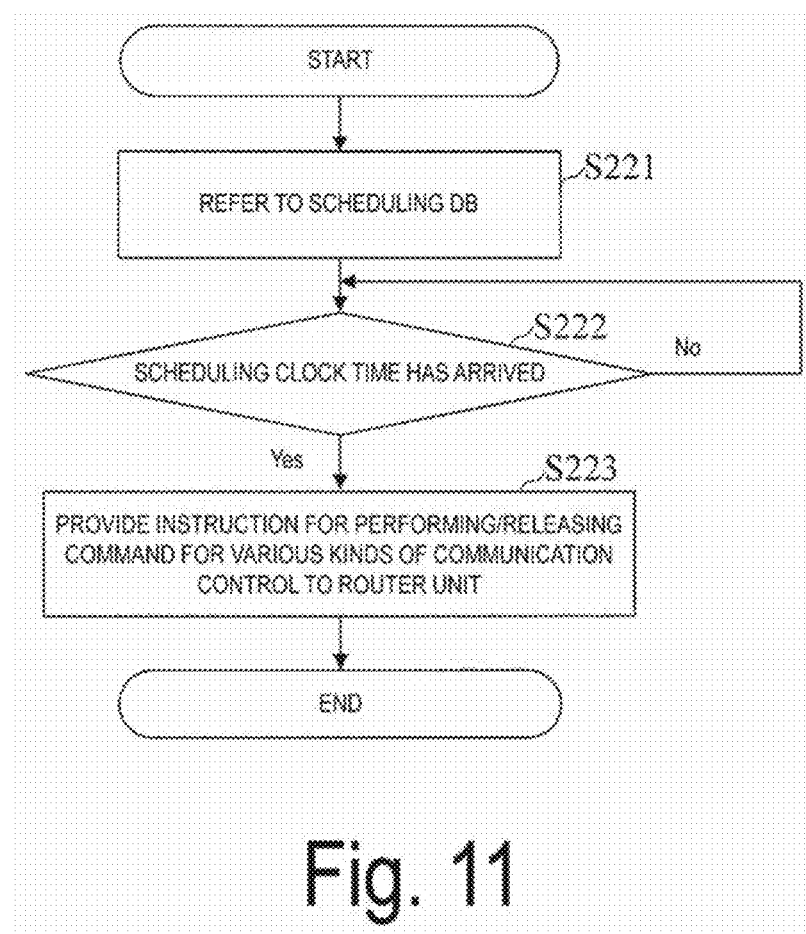
FIG. 11 illustrates an example of a processing flow of the scheduling information processing unit on the server side.

FIG. 11 illustrates an example of a processing flow of the scheduling information processing unit 22 on the side of the server 92. The scheduling information processing unit 22 refers to the scheduling DB 25 (S221), and when a scheduled clock time arrives (Yes in S222), the scheduling information processing unit 22 provides an instruction for performing/releasing a command for various kinds of communication control to the router unit 21 (S223).

Figure 12:
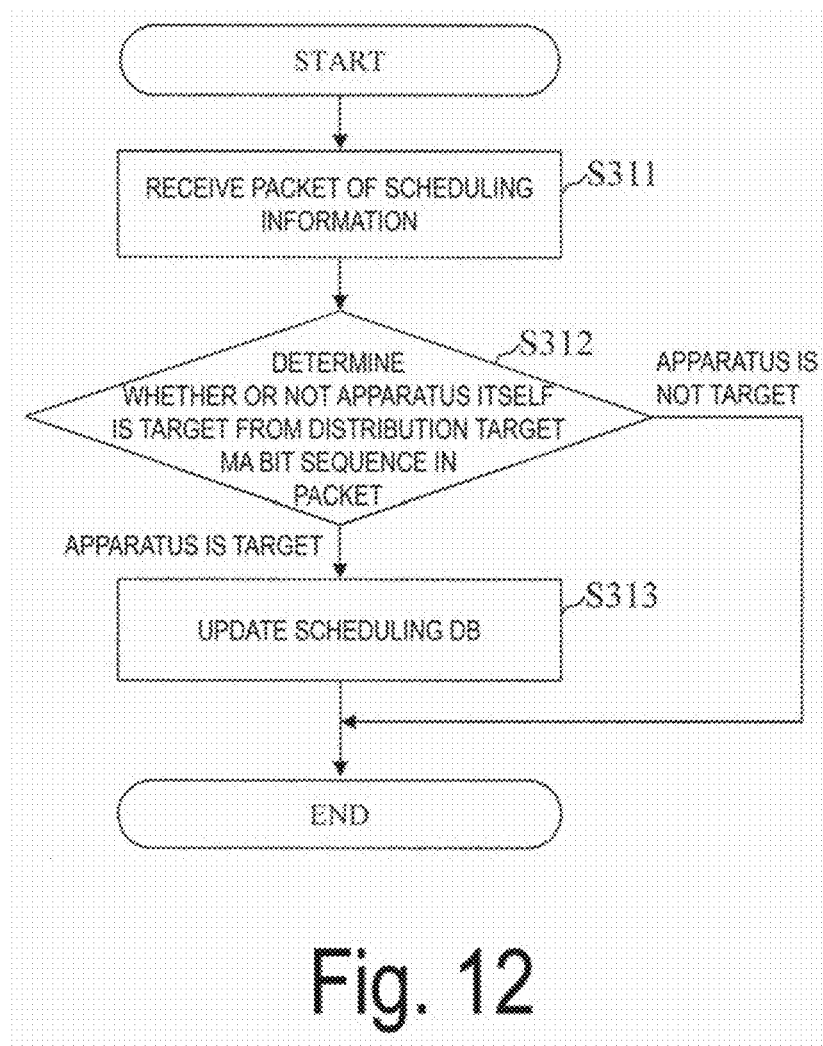
FIG. 12 illustrates an example of a processing flow of a scheduling information reception unit on the IoT apparatus side.

FIG. 12 illustrates an example of a processing flow of the scheduling information reception unit 33 on the side of each IoT apparatus 93. If a packet of scheduling information is received (S311), then whether the apparatus itself is a target is determined from the distribution target MA bit sequence in the packet (S312). Then, in a case in which the apparatus itself is a target (Yes in S312), the scheduling information reception unit 33 reads the communication schedule from the scheduling DB 35, sets a communication schedule of the IoT apparatus 93 that is a control target in accordance with the communication scheduling information, and updates the scheduling DB 35. On the other hand, if the apparatus is not a target (No in S312), the scheduling information reception unit 33 ends the processing.

Here, the scheduling information reception unit 33 holds an MA number (0ABCD number) to which the apparatus including the scheduling information reception unit 33 itself belongs. In this manner, whether or not the apparatus including the scheduling information reception unit 33 itself is included in the control targets of the received scheduling information is determined in Step S312.

Figure 13:
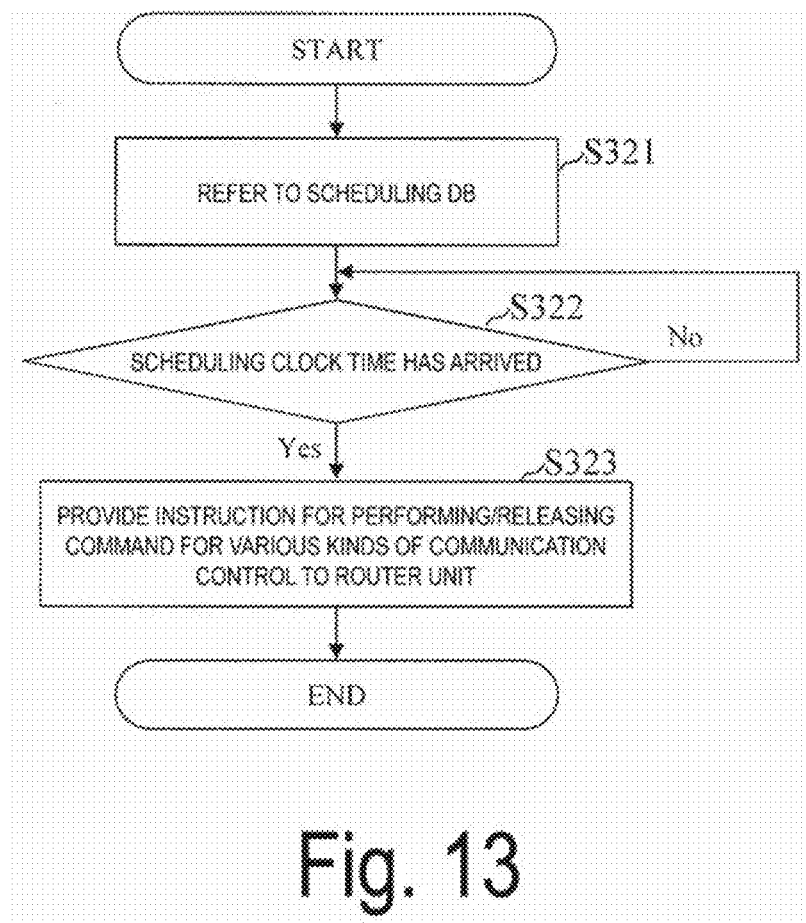
FIG. 13 illustrates an example of a processing flow of the scheduling information processing unit on the IoT apparatus side.

FIG. 13 illustrates an example of a processing flow of the scheduling information processing unit 32 on the side of each IoT apparatus 93. The scheduling information processing unit 32 refers to the scheduling DB 35 (S321), and when a scheduled clock time arrives (Yes in S322), the scheduling information processing unit 32 provides an instruction for performing/releasing a command for various kinds of communication control to the router unit 31 (S323).

As setting of the communication schedule for the IoT apparatus 93, it is possible to exemplify utilization of priority communication services, setting of communication paths, addition of priority identifiers (ToS, CoS, TC, and the like), restriction of communication bandwidths, control of communication flows (TCP window control and the like), accumulation of communication in the apparatus itself or a nearby replacement server, and suppression of non-essential and non-urgent communication through retransmission with delays, for example.

Second Embodiment

Figure 14:
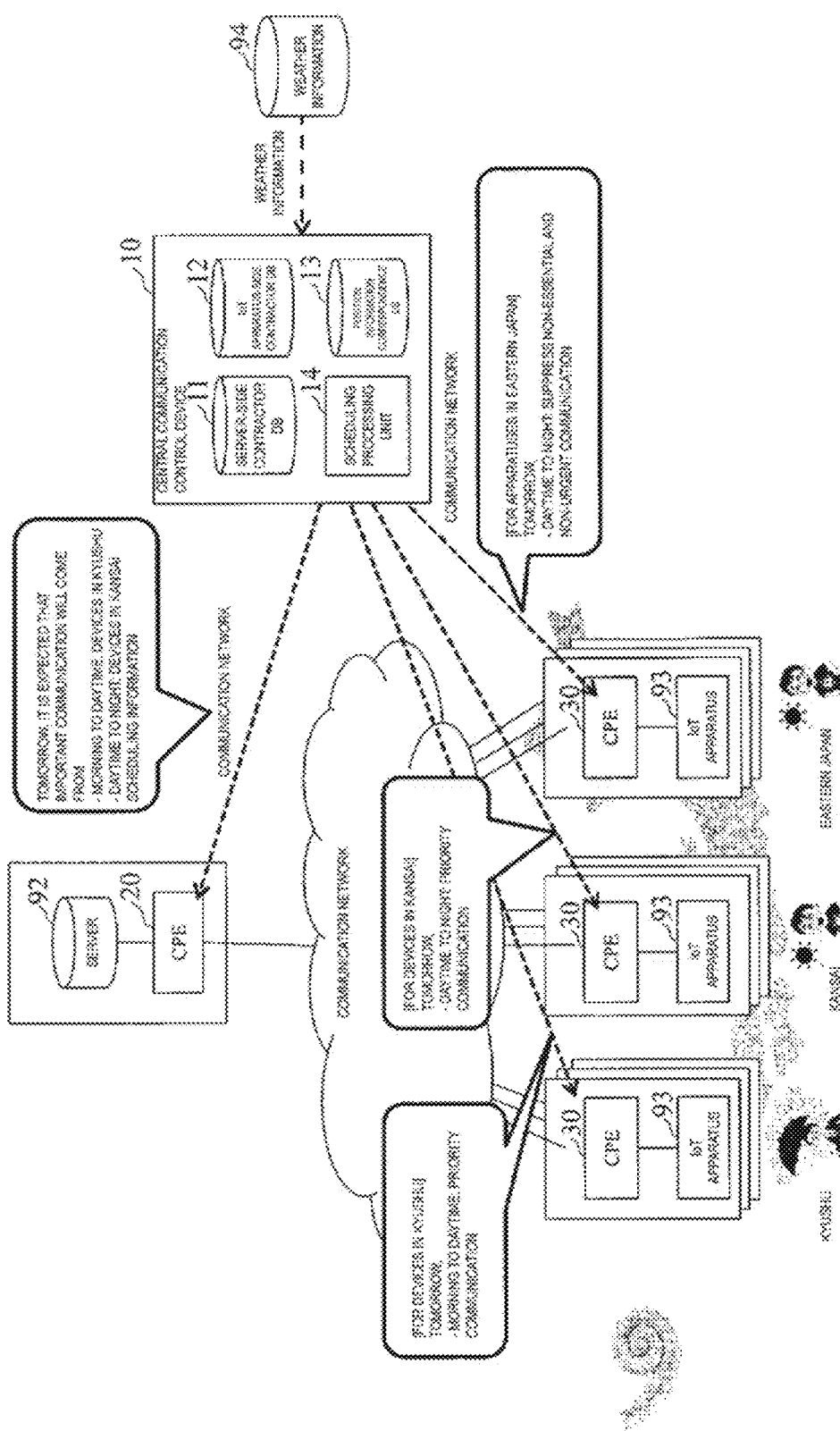
FIG. 14 illustrates an example of operation of a system according to a second embodiment.

An example of operations of the system according to the present disclosure at the time of occurrence of a typhoon will be described with reference to FIG. 14. In the present embodiment, communication scheduling information is distributed in advance before coming of a typhoon to an area where the typhoon is likely to come and a server, from weather forecast information.

The central communication control device 10 acquires, as event information, information that a typhoon is coming to Kyushu from the morning to the daytime on January 5th and is coming to Kansai from the daytime to the night on January 6th. In this case, the central communication control device 10 broadcasts first to fourth frames as scheduling information.

First Frame
Communication control start time (year, month, date, hour, minute, second): January 5th, ○○○○, 05:00: ○
Communication control end time (year, month, date, hour, minute, second): January 5th ○○○○, 12:00: ○
Distribution target MA bit sequence: 092 to 097, 0982 to 0987, 099
Control type code: change in priority identifier (TC)
Various communication control codes: change priority of entire communication to 7
Here, "092 to 097, 0982 to 0987, and 099" are area codes in Kyushu.

Second Frame
Communication control start time (year, month, date, hour, minute, second): January 5th, ○○○○, 05:00: ○
Communication control end time (year, month, date, hour, minute, second): January 5, ○○○○, 18:00: ○
Distribution target MA bit sequence: 01 to 04
Control type code: change in priority identifier (TC)
Various communication control codes: change priority of communication with priority of equal to or less than 6 to 0
Here "01 to 04" are area codes in Eastern Japan.

Third Frame
Communication control start time (year, month, date, hour, minute, second): January 5, ○○○○, 12:00: ○
Communication control end time (year, month, date, hour, minute, second): January 5, ○○○○, 18:00: ○
Distribution target MA bit sequence: 06, 072 to 075, 0771 to 0775, 078 to 079
Control type code: change in priority identifier (TC)
Various communication control codes: change priority of entire communication to 7
Here, "06, 072 to 075, 0771 to 0775, 078 to 079" are area codes in Kansai.

Fourth Frame
Communication control start time (year, month, date, hour, minute, second): January 5th, ○○○○, 05:00: ○
Communication control end time (year, month, date, hour, minute, second): January 5, ○○○○, 18:00: ○
Distribution target MA bit sequence: 01 to 04
Control type code: change in TCP window size
Various communication control codes: change in window size of communication with priority of equal to or less than 6 to 1300 bytes
Here "01 to 04" are area codes in Eastern Japan.

Each communication control device 30 performs the following communication control in accordance with the first to third frames. For example, each communication control device 30 in Kyushu performs communication with priority of "7" from 05:00 to 12:00 on January 5th. Each communication control device 30 in Kansai performs communication with priority of "7" from 12:00 to 18:00 on January 5th. Each communication control device 30 in Eastern Japan performs communication with priority of "0" from 5:00 to 18:00 on January 5th.

The communication control device 20 performs the following communication control in accordance with the fourth frame. From 5:00 to 18:00 on January 5th, the window size of the communication with priority of equal to or less than 6 is set to 1300 bytes. Because the server 92 receives, with priority, communication of the area where the typhoon comes in this manner, the server 92 can receive genuinely important communication in the present embodiment.

Third Embodiment

Figure 15:
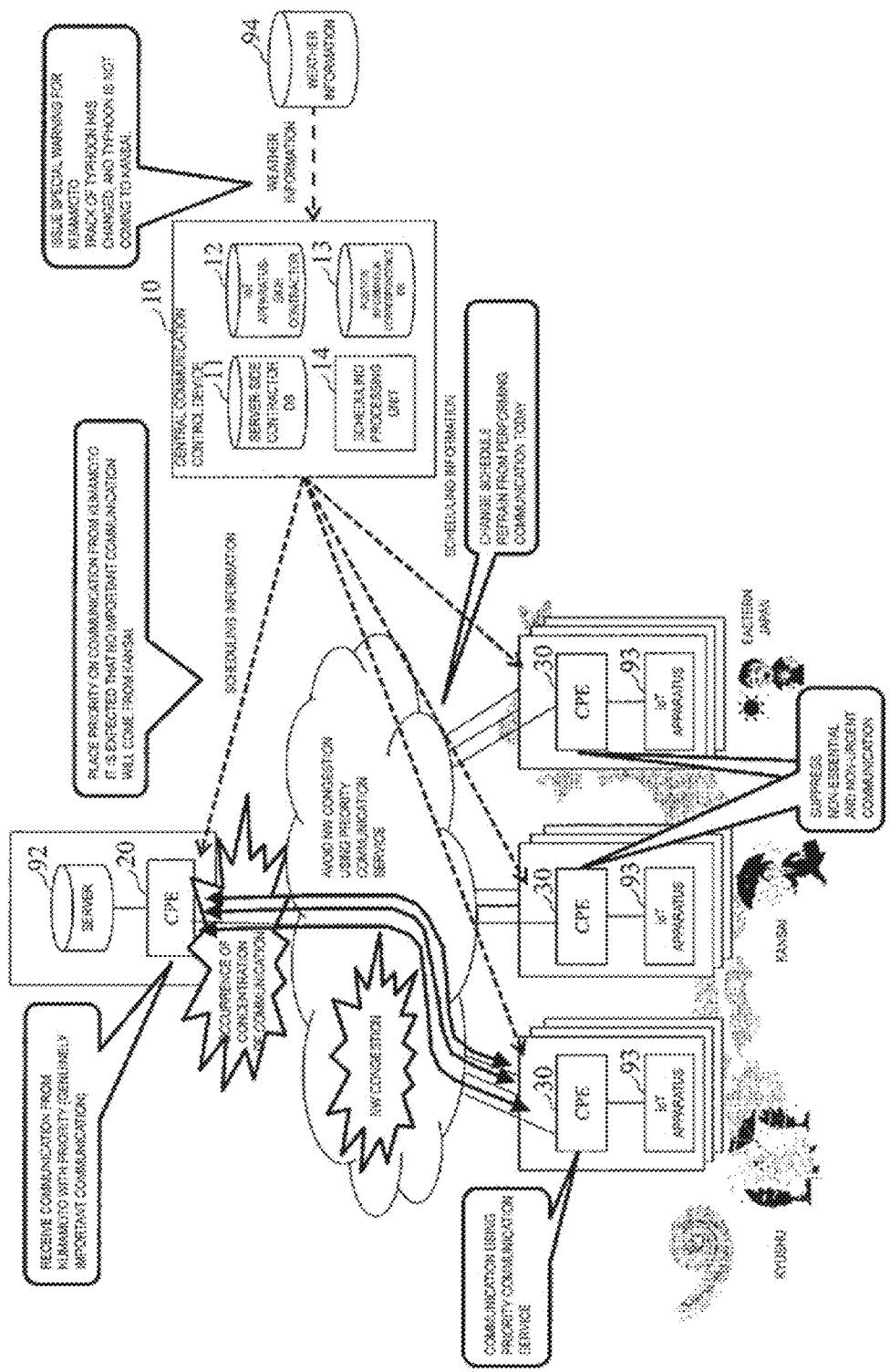
FIG. 15 illustrates an operation example of a system according to a third embodiment.

An example of operations of the system according to the present disclosure when the typhoon is coming will be described with reference to FIG. 15. In the present embodiment, communication control is performed in accordance with a communication schedule distributed in advance. Also, scheduling information is distributed with appropriate changes added thereto from the latest typhoon information in the present embodiment.

The central communication control device 10 acquires, as event information, information that a special warning was issued for Kumamoto when the typhoon arrived at Kyushu and the path of the typhoon has changed and is not coming to Kansai. In this case, the central communication control device 10 distributes the following scheduling information to the communication control devices 20 and 30.

For example, the central communication control device 10 distributes scheduling information indicating that communication with each communication control device 30 in Kyushu is to be performed using a priority communication service and non-essential and non-urgent communication is to be suppressed for each communication control device 30 in Kansai and Eastern Japan. Here, as the communication using a priority communication service, it is possible to exemplify setting of priority to "7", for example. As the control for suppressing non-essential and non-urgent communication, it is possible to exemplify setting of priority to "0" similarly to the second embodiment, for example.

For example, the central communication control device 10 distributes scheduling information indicating that priority is to be placed on communication from Kumamoto and it is expected that no important communication is coming from Kansai, to the communication control device 20. As the control that priority is placed on communication from Kumamoto and it is not expected that important communication is not coming from Kansai, it is possible to exemplify placing of priority on communication with priority of "7", for example.

Because the server 92 receives communication from Kumamoto with priority, the server 92 can receive genuinely important communication in the present embodiment.

Fourth Embodiment

Figure 16:
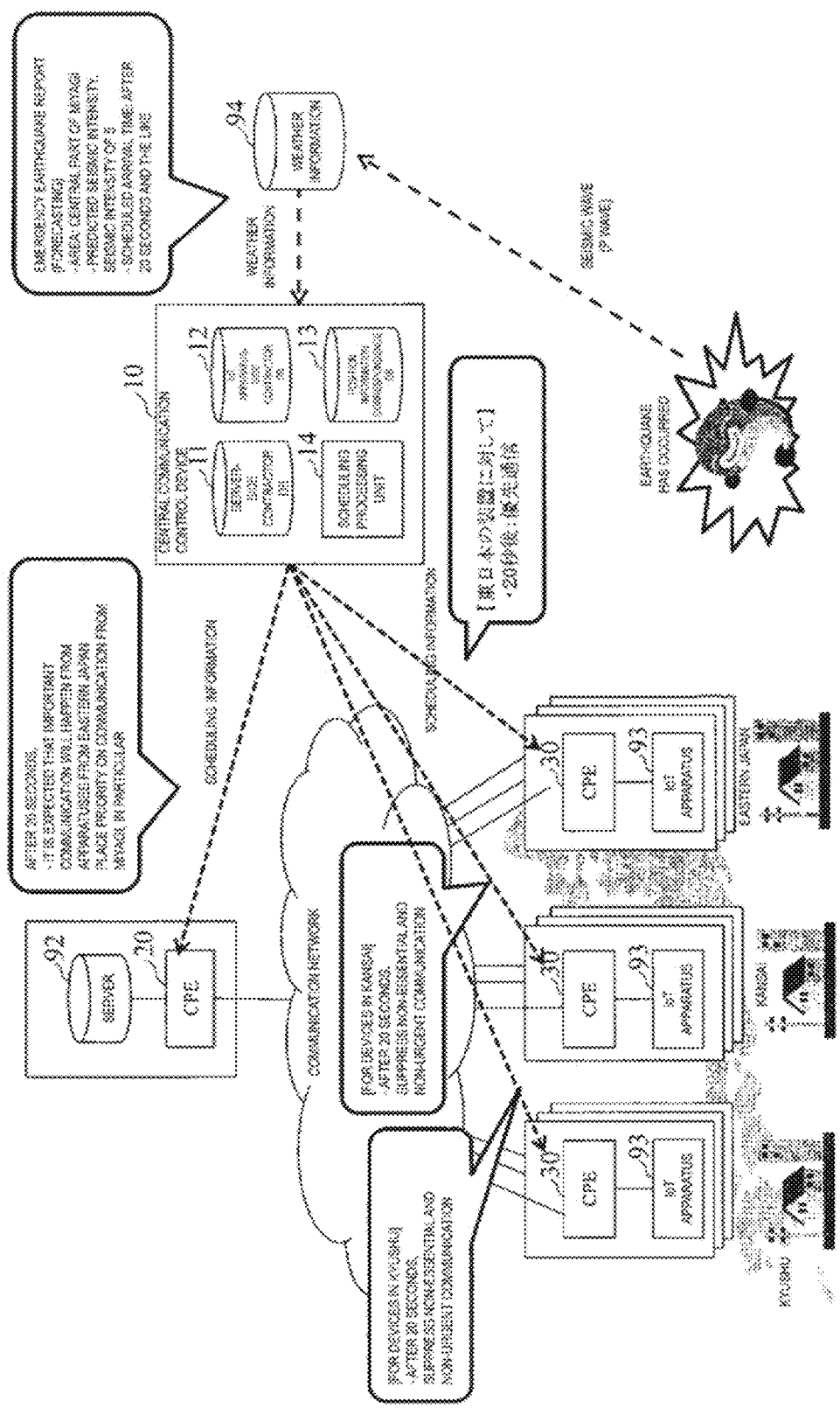
FIG. 16 illustrates an operation example of a system according to a fourth embodiment.

An example of operations of the system according to the present disclosure before occurrence of an earthquake will be described with reference to FIG. 16. In the present embodiment, scheduling information of communication is distributed to an earthquake occurring area and a server on the basis of an emergency earthquake report (forecasting).

The central communication control device 10 acquires, as event information, an emergency earthquake report (forecasting) including, for example, an area: "central part of Miyagi", estimated seismic intensity: "seismic intensity of 5", and estimated arrival time: "after 20 seconds". In this case, the central communication control device 10 distributes the following scheduling information to the communication control devices 20 and 30.

For example, the central communication control device 10 distributes scheduling information indicating that it is expected that important communication is coming from devices in Eastern Japan 20 seconds later and priority is placed on communication from Miyagi, in particular, to the communication control device 20.

For example, the central communication control device 10 distributes scheduling information indicating that communication with each communication control device 30 in Eastern Japan is to be performed using priority communication at and after 20 seconds and non-essential and non-urgent communication is to be suppressed at and after 20 seconds for each communication control device 30 in Kyushu and Kansai.

Fifth Embodiment

Figure 17:
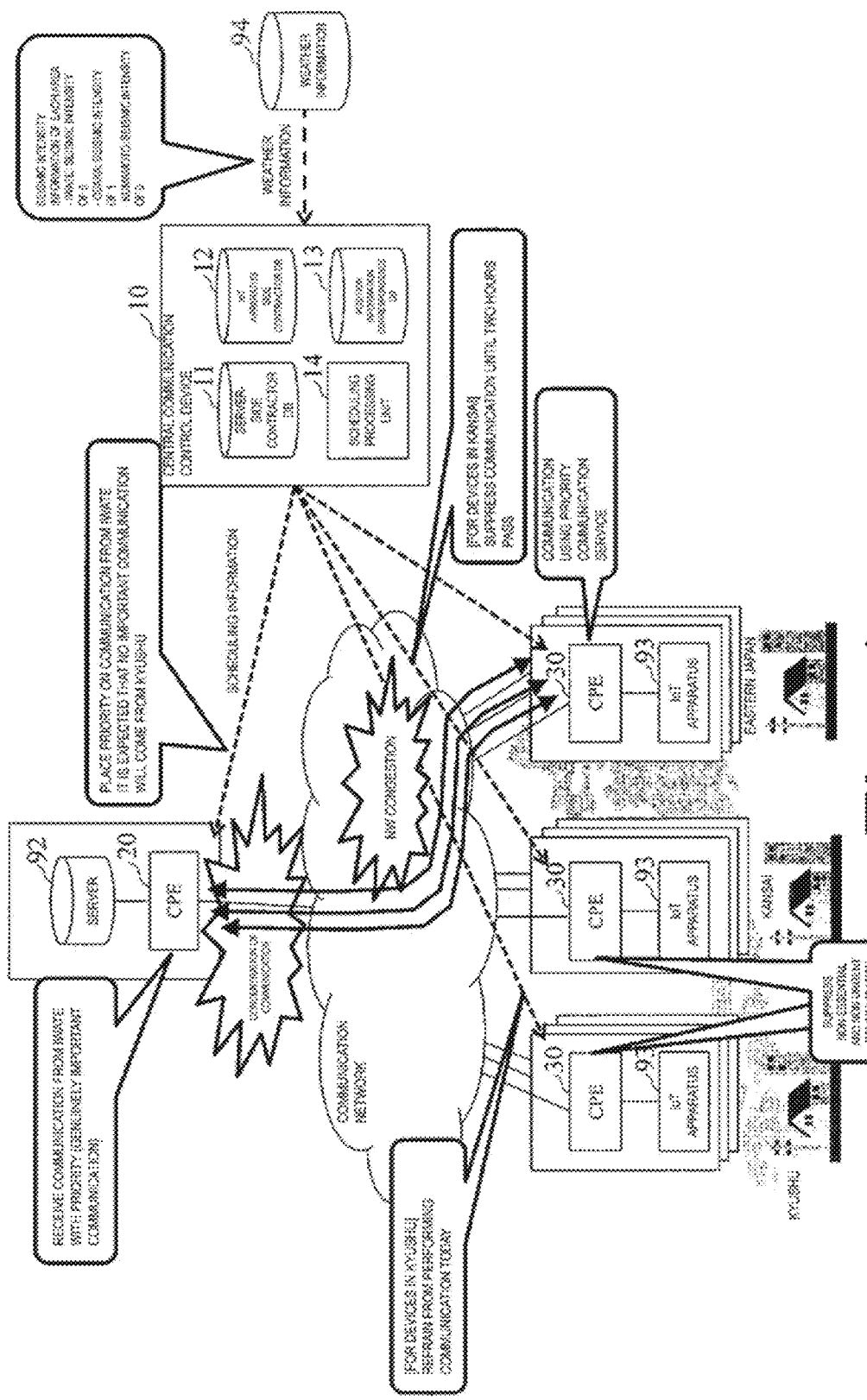
FIG. 17 illustrates an operation example of a system according to a fifth embodiment.

An example of operations of the system according to the present disclosure after an earthquake occurs will be described with reference to FIG. 17. In the present embodiment, communication control is performed in accordance with a distributed communication schedule. Also, scheduling information is distributed with appropriate changes added thereto from earthquake information such as seismic intensity information.

The central communication control device 10 acquires seismic intensity information at each location. For example, the central communication control device 10 acquires, as event information, the information that the seismic intensity in Iwate is 6, the seismic intensity in Osaka is 1, and the seismic intensity in Kumamoto is 0. In this case, the central communication control device 10 distributes the following scheduling information to the communication control devices 20 and 30.

For example, the central communication control device 10 distributes scheduling information indicating that it is expected that important communication is not coming from Kyushu and priority is to be placed on communication from Iwate, to the communication control device 20.

For example, the central communication control device 10 distributes scheduling information indicating that communication with each communication control device 30 in Eastern Japan is to be performed using a priority communication service and non-essential and nonurgent communication is to be suppressed for each communication control device 30 in Kyushu and Kansai.

Because the server 92 receives communication from Iwate with priority, the server 92 can receive genuinely important communication in the present embodiment.

Sixth Embodiment

Figure 18:
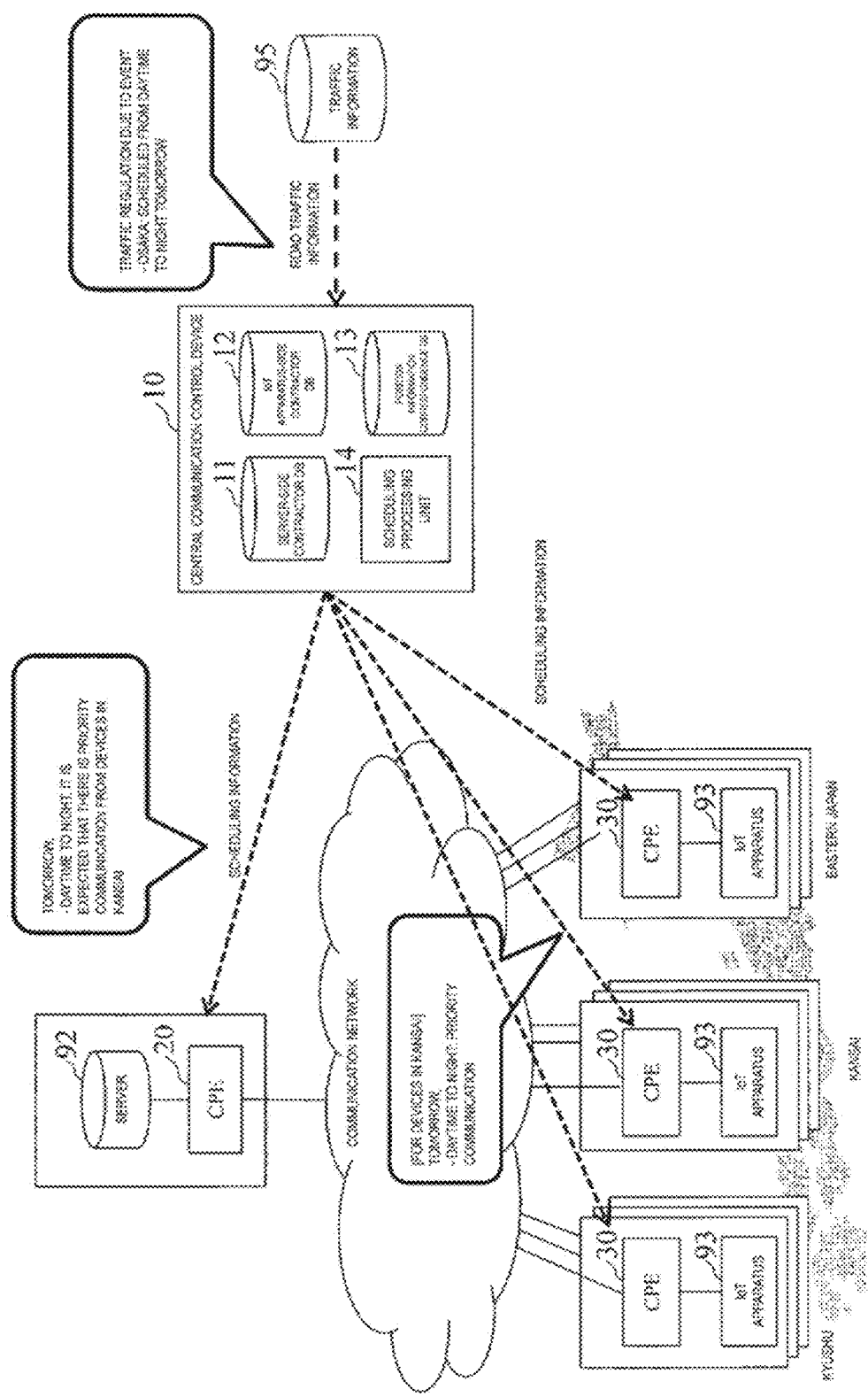
FIG. 18 illustrates an operation example of a system according to a sixth embodiment.

An example of operations of the system according to the present disclosure a day before taking place of an event will be described with reference to FIG. 18. In the present embodiment, scheduling information of communication is distributed to a traffic restriction area and a server on the basis of road traffic information.

The central communication control device 10 acquires, as event information, information that traffic restriction is scheduled from the daytime to the night tomorrow in Osaka due to an event. In this case, the central communication control device 10 distributes the following scheduling information to the communication control devices 20 and 30.

For example, the central communication control device 10 distributes scheduling information indicating that it is expected that priority communication is coming from devices in Kansai from the daytime to the night tomorrow, to the communication control device 20.

For example, the central communication control device 10 distributes scheduling information indicating that communication with each communication control device 30 in Kansai is to be performed using a priority communication service from the daytime to the night tomorrow.

Seventh Embodiment

Figure 19:
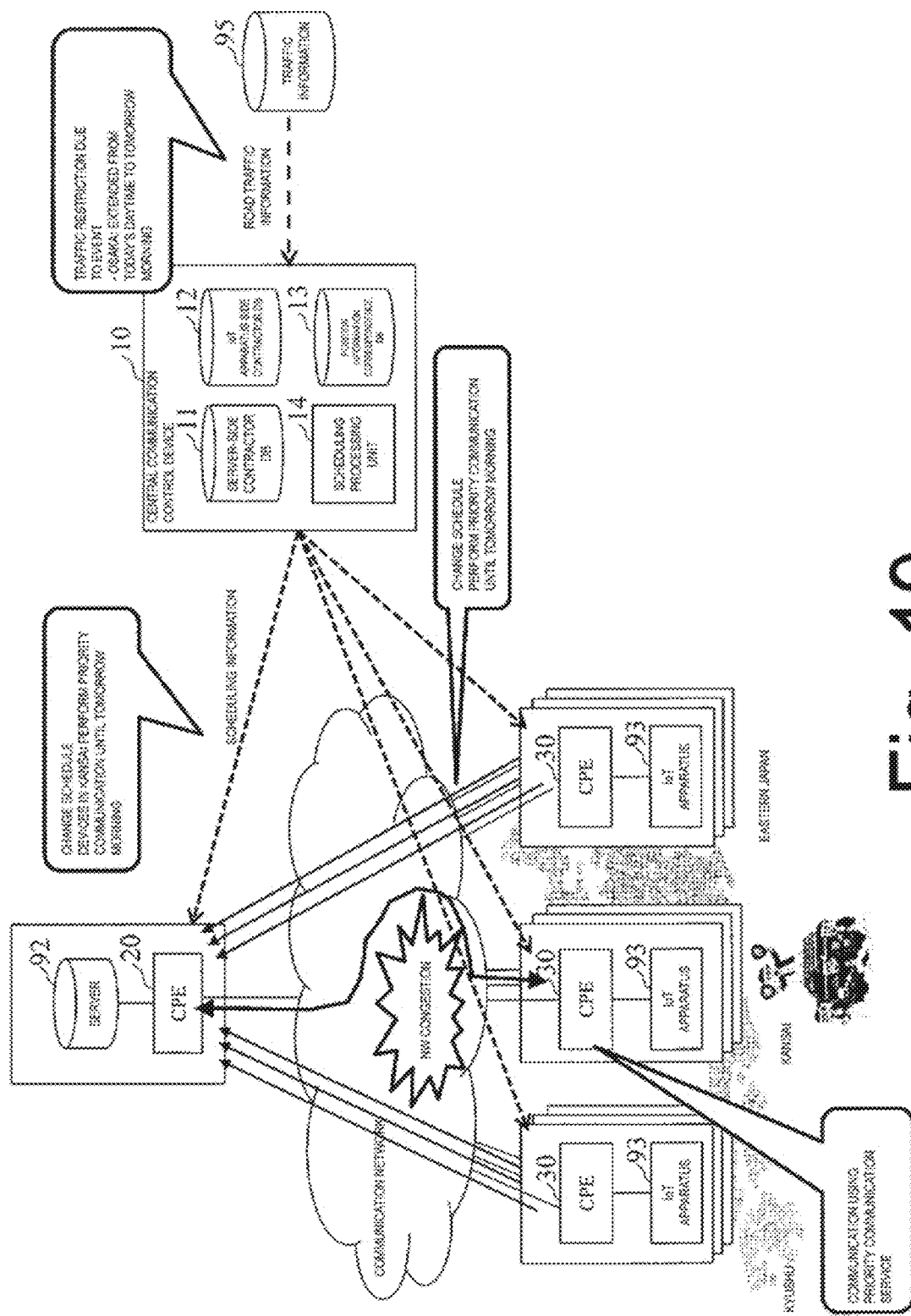
FIG. 19 illustrates an operation example of a system according to a seventh embodiment.

An example of operations of the system according to the present disclosure on the day when an event takes place will be described with reference to FIG. 19. In the present embodiment, communication control is performed in accordance with a communication schedule distributed in advance. Also, scheduling information is distributed with appropriate changes added thereto from the latest road restriction information.

The central communication control device 10 acquires, as event information, information indicating that traffic restriction due to the event is extended form today's daytime to tomorrow morning. In this case, the central communication control device 10 distributes the following scheduling information to the communication control devices 20 and 30. The extension is performed by setting "communication control start time (year, month, date, hour, minute, second)" and "communication control end time (year, month, date, hour, minute, second)" again, for example.

For example, the central communication control device 10 distributes scheduling information indicating that the schedule has been changed and priority communication with each device in Kansai is to be performed until tomorrow morning, to the communication control device 20.

For example, the central communication control device 10 distributes scheduling information indicating that the schedule is to be changed for each communication control device 30 in Kansai and communication therewith is to be performed using a priority communication service until tomorrow morning.

Because the server 92 receives communication from Kansai with priority, the server 92 can avoid network congestion and receive genuinely important communication in the present embodiment.

Each device in the present disclosure can be realized by a computer and a program, and it is possible to record the program in a recording medium or to provide the program through a network.

INDUSTRIAL APPLICABILITY

The present disclosure can be applied in the information communication industry.

REFERENCE SIGNS LIST

10 Central communication control device
11 Server-side contractor database 12 IoT apparatus-side contractor database
13 Position information correspondence database
14 Scheduling processing unit
20, 30 Communication control device
21 Router unit
22 Scheduling information processing unit
23 Scheduling information reception unit
24 Communication target list
25, 35 Scheduling DB
31 Router unit
32 Scheduling information processing unit
33 Scheduling information reception unit
92 Server
93 IoT apparatus
94 Weather information server
95 Traffic information server
96 Disaster information server
97 Server

The invention claimed is:

1. A communication network control system comprising:
a plurality of communication control devices provided in a plurality of apparatuses that are arranged in a geographically dispersed manner and that are included in a communication network to which the plurality of apparatuses are connected, the communication control devices being configured to control communication of each of the plurality of apparatuses in accordance with distributed communication control information; and
a central communication control device configured to distribute communication control information to the plurality of communication control devices,
wherein the central communication control device
collects event information from a source outside of the communication network, where the event information identifies an event and links position information for where the event occurs in the communication network to the event linked to position information,
determines an area in the communication network where an amount of communication in the communication network will likely increase, where the determination is based on the collected event information,
generates communication control information that places a priority on communication in the area in response to a determination that the amount of communication increases in the area of the communication network, and
distributes the generated communication control information to the plurality of communication control devices, where the communication control information includes area codes for specifying areas in the communication network where the amount of communication will likely increase and the area codes are allocated to subnet IDs in a network address of a data packet.

2. The communication network control system according to claim 1, wherein
the central communication control device
determines an area and a time with a probability that the amount of communication increases, using the collected event information, and
in a case in which there is an area with the probability that the amount of communication increases, generates the communication control information that places a priority on the communication in the area in the time with the probability that the amount of communication increases.

3. The communication network control system according to claim 2, wherein the plurality of apparatuses include a server, and
a communication control device of the plurality of communication control devices that is included in the server places a priority on communication with the area with the probability that the amount of communication increases in the time with the probability that the amount of communication increases, in accordance with the distributed communication control information.

4. The communication network control system according to claim 3, wherein
the plurality of apparatuses include IoT apparatuses,
the communication control device included in the server creates an access control list of the IoT apparatuses that perform communication with the server using the communication control information received from the central communication control device and distributes the access control list to each of the IoT apparatuses, and
the communication control devices included in the IoT apparatuses access the server in accordance with the access control list received from the communication control device included in the server.

5. The communication network control system according to claim 1 wherein the network address of the data packets includes a plurality of area codes therein.

6. The communication network control system according to claim 1 wherein the network address of the data packets includes a range of area codes therein.

7. A communication network control system comprising:
a plurality of communication control devices provided in a plurality of apparatuses that are arranged in a geographically dispersed manner and that are included in a communication network to which the plurality of apparatuses are connected, the communication control devices being configured to control communication of each of the plurality of apparatuses in accordance with distributed communication control information; and
a central communication control device configured to distribute communication control information to the plurality of communication control devices,
wherein the central communication control device
collects event information from a source outside of the communication network, where the event information identifies an event and links position information for where the event occurs in the communication network to the event linked to position information,
converting the position information for the events into an area code,
determines an area in the communication network where an amount of communication in the communication network will likely increase by linking the area code for a given event to one or more network addresses in the communication network,
generates communication control information that places a priority on communication in the area in response to a determination that the amount of communication increases in the area of the communication network, and
distributes the generated communication control information to the plurality of communication control devices, where the communication control information includes area codes for specifying areas in the communication network where the amount of communication will likely increase and the area codes are allocated to subnet IDs in a network address of a data packet.

8. The communication network control system according to claim 7, wherein the central communication control device
  determines an area and a time with a probability that the amount of communication increases, using the collected event information, and
  in a case in which there is an area with the probability that the amount of communication increases, generates the communication control information that places a priority on the communication in the area in the time with the probability that the amount of communication increases.

9. The communication network control system according to claim 8, wherein
  the plurality of apparatuses include a server, and
  a communication control device of the plurality of communication control devices that is included in the server places a priority on communication with the area with the probability that the amount of communication increases in the time with the probability that the amount of communication increases, in accordance with the distributed communication control information.

10. The communication network control system according to claim 9, wherein
  the plurality of apparatuses include IoT apparatuses,
  the communication control device included in the server creates an access control list of the IoT apparatuses that perform communication with the server using the communication control information received from the central communication control device and distributes the access control list to each of the IoT apparatuses, and
  the communication control devices included in the IoT apparatuses access the server in accordance with the access control list received from the communication control device included in the server.

* * * * *